INVENTOR.
ARVEL L. VANDERGRIFF

BY Jennings & Carter
ATTORNEYS

Aug. 28, 1956　　　A. L. VANDERGRIFF　　　2,760,235
APPARATUS FOR SEPARATING HEAVY OBJECTS FROM SEED COTTON
Filed Oct. 8, 1952　　　3 Sheets-Sheet 2

INVENTOR.
ARVEL L. VANDERGRIFF
BY
Jennings & Carter
ATTORNEYS

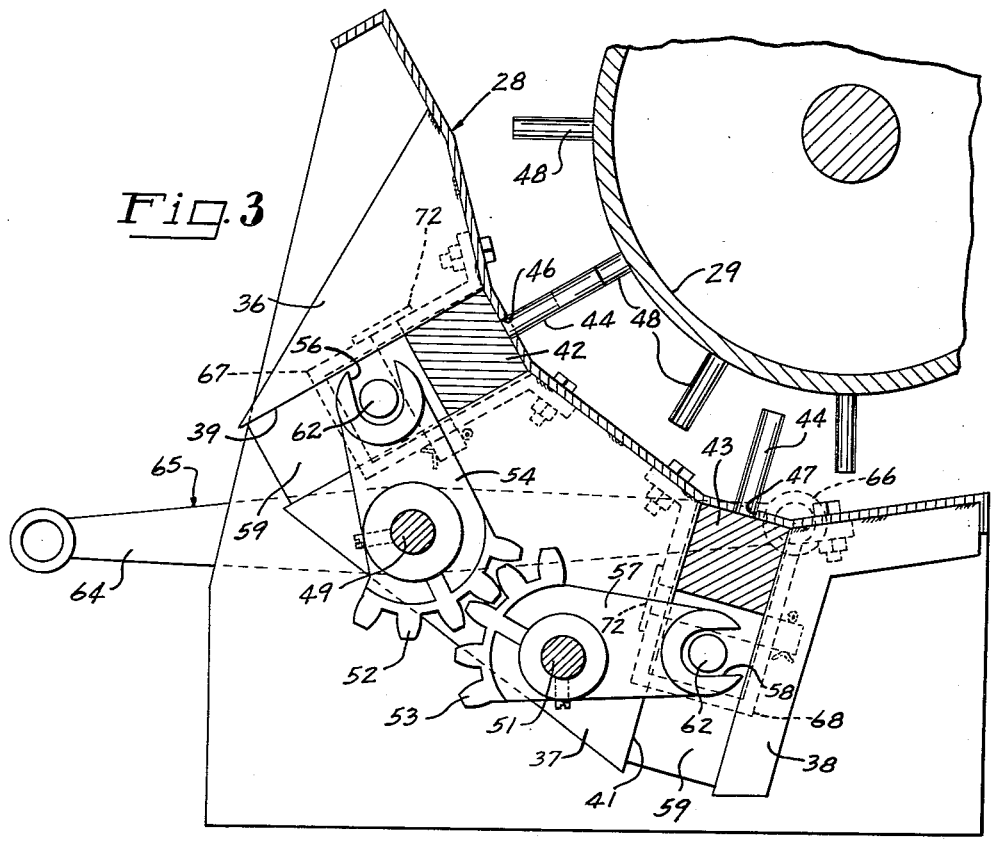
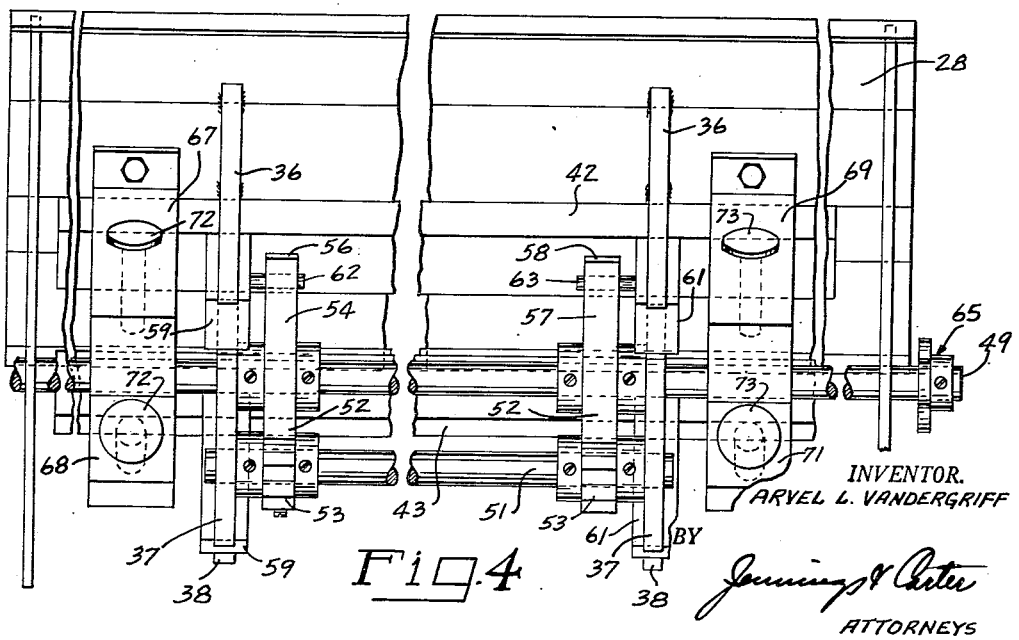

United States Patent Office 2,760,235
Patented Aug. 28, 1956

2,760,235

APPARATUS FOR SEPARATING HEAVY OBJECTS FROM SEED COTTON

Arvel L. Vandergriff, Columbus, Ga., assignor to Lummus Cotton Gin Company, a corporation of Georgia Application October 8, 1952, Serial No. 313,735

10 Claims. (Cl. 19—38)

This invention relates to apparatus for separating green bolls, stones and other heavy objects from seed cotton as it comes from the field and delivering the cotton into a conveying hot air stream, and has for an object the provision of apparatus of the character designated which shall include improved means for delivering the cotton into the air stream, and means operable selectively, when required, to break unopened cotton bolls, and which shall include improved means for separating heavy objects from the cotton.

In accordance with my invention I provide a casing the lower portion of which is relatively wide and deep from front to rear thus forming a relatively large chamber. The upper portion of the casing is in the form of a passage the width of the chamber but which is relatively narrow from front to rear, and extends upwardly from the rear of the chamber. Cotton is introduced into the upper end of the narrow passage by an improved feeder which, when required, also serves to break unopened bolls. Heated air is introduced at the front into the relatively large chamber and passes upwardly through the narrow passage taking the cotton with it. Green bolls, stones and other heavy objects fall down through the air stream into the bottom of the large chamber and are discharged by an air sealed dropper.

A particular feature of my invention resides in the manner in which the cotton is fed into the upper end of the narrow passage in a dispersed condition which prevents undue accumulations of cotton in the passage and permits heavy objects to fall readily out of the cotton stream. Another feature consists in providing retractable breaker pins in the feeder housing, whereby when there are no dry, unopened bolls present in the cotton the pins may be retracted out of the way and not used.

The foregoing and other features of my invention are illustrated in the accompanying drawings forming a part of this application in which:

Fig. 3 is a cross sectional view of the feeding mechanism, drawn to a larger scale;

Fig. 4 is a rear elevational view of the feeding mechanism, drawn to slightly smaller scale than Fig. 3;

Figure 1:
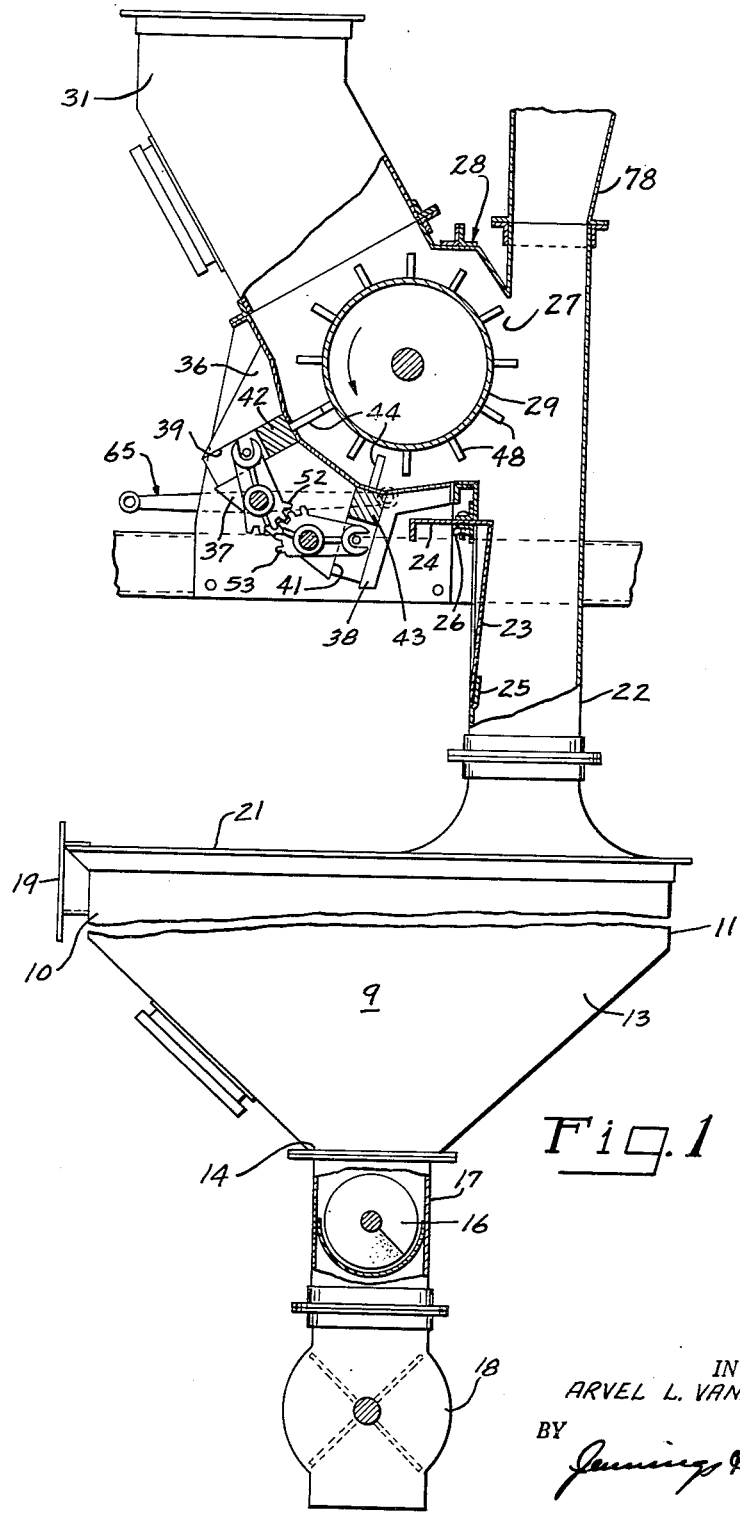
Fig. 1 is a side elevation, partly in section.

Referring to the drawings for a better understanding of my invention, my improved apparatus comprises a main housing the lower portion of which is in the form of a relatively large rectangular chamber 9 having a front 10, a back 11, and sides 12 and 13. The lower portion of the chamber terminates in a hopper bottom 14. Disposed in the hopper bottom is a screw conveyor 16 which is wholly enclosed within a suitable housing 17. An air sealed dropper 18 at one end of the screw conveyor serves to discharge heavy objects from the bottom of the chamber 9. Extending across the front of the chamber is an inlet 19 for the introduction of heated air into the chamber which serves, in a manner to be described later, to dry the cotton and to aid in separating the cotton from heavy objects, such as green bolls, stones, and other heavy objects.

Figure 2:
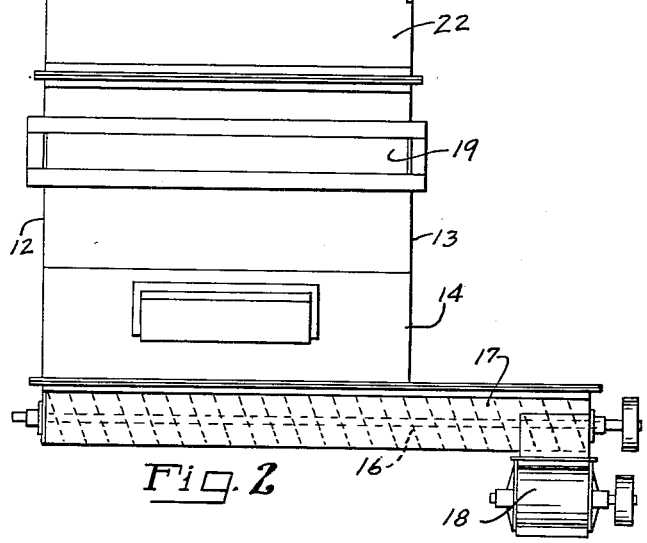
Fig. 2 is a rear elevation with parts of the feeding mechanism removed.

The upper part of the chamber just described is provided with a cover 21. Connected to the chamber and extending upwardly therefrom at the rear is a conduit, or passage 22 which, as will be seen from Figs. 1 and 2, is relatively wide and shallow. Mounted within the passage 22 is a flexible plate 23 which is secured along its lower edge at 25 to the conduit. A lip 24 extends outwardly of the conduit whereby the plate may be moved inwardly or outwardly to vary the cross sectional area of the passage and consequently the velocity of the air passing up through the passage. The plate 23 is held in adjusted position by means of a clamping bolt 26.

Extending across the passage 22 from side to side adjacent the upper end thereof is an inlet opening 27. Connected to the inlet opening 27 is a feeder housing 28. Mounted in the feeder housing 28 is a spiked feed roller 29, in position, when rotated in the direction indicated by the arrow, to deliver cotton in a loose, dispersed condition whereby heavy objects may readily fall out of it.

Connected to the upper end of the housing 28 is a supply conduit 31 through which cotton is supplied to the housing 28 from an air sealed dropper 32. This feature is important in that it insures a uniform feeding of the cotton into the passage 22. If the cotton were introduced directly from the air sealed dropper 32, it would necessarily come at once in contact with the air under pressure in the passage which would cause it to float in part on the air stream and be fed into the passage 22 in large non-uniform masses from which it would be difficult to separate the heavy objects. Therefore, in accordance with my invention I provide for the cotton passing down the supply conduit 31 to be engaged by the spiked roller 29 and be carried into the passage 22 in a uniform, dispersed condition.

At the beginning of the cotton ginning season, especially with mechanically picked cotton, a great many green bolls are gathered and mixed with the seed cotton as it comes from the field. It is desirable that these green bolls be separated out of the seed cotton before it passes to the gin for the reason that the cotton contained in them is wet and gummy and tends to spoil the sample of the cotton being ginned. Later in the season, after frost has fallen, the green bolls remaining on the stalks become dry so that it is profitable to reclaim the cotton in them. I accordingly provide, in my improved apparatus, boll breaking means which may be placed in operation, or taken out of operation when required. Mounted on the front of the feeder housing 28, at each side thereof, are three brackets 36, 37 and 38 which are spaced apart a sufficient distance to provide guideways 39 and 41. Mounted in the guideways 39 and 41 are bars 42 and 43, each of which carries a multiplicity of spikes 44, see Fig. 5, in position to pass through suitable, corresponding, openings 46 and 47 in the housing 28 and be in position to cooperate with spikes 48 on the roller 29. It will be seen that when the bars 42 and 43 are in the positions shown in Figs. 1 and 3 of the drawings, unopened bolls of cotton being fed into the passage 22 will be broken up by the interaction of the spikes 44 and 48.

Figure 5:
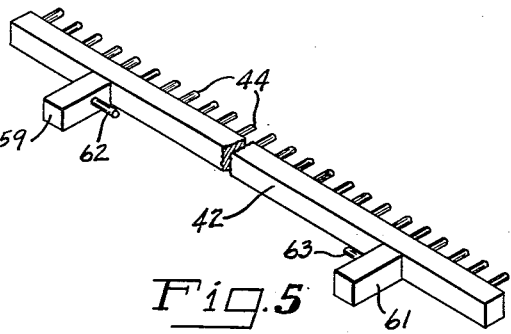
Fig. 5 is a perspective view of one of the spiked breaker bars employed with my invention; and, Fig. 6 is a diagrammatic view illustrative of the operation of the apparatus.

Mounted within the brackets 37 are two shafts 49 and 51 upon which are mounted, respectively, segmental gear members 52 and 53. The gear member 52 is provided with an arm 54 having a slot 56 in the outer end thereof and the gear member 53 is provided with an arm 57 having a slot 58 on the outer end thereof. Each of the bars 42 and 43, as shown in Fig. 5, is provided with rectangular lugs 59 and 61 which are adapted to move in the guideways 39 and 41. The lug 59 is provided with a pin 62 and the lug 61 with a pin 63, which pins are engaged respectively by the slotted arms 54 and 57. A handle 65 having arms 64 and 66 is mounted on the shaft 49 to rotate the shaft 49, and it, in turn, rotates the shaft 51 through the gears 52 and 53. When the arm 64 is pulled downward, the slotted arm 54 pulls the bar 42 downward and the arm 57 pulls the bar 43 downward so as to retract the breaker pins 44 from the housing 28. When the arm 66 is pulled downward, it raises the slotted arm 54 and with it the arm 57 so as to raise the bars 42 and 43 and cause the breaker spikes 44 to enter the housing 28.

Secured to the housing 28, at one end thereof, are stirrups 67 and 68 and at the other end a corresponding pair of stirrups 69 and 71 in which the bars 42 and 43 move and which limit their outward movements. During the season when green bolls are mixed with the cotton, the bars 43 and 44 are caused to move outward and rest in the bottoms of their respective stirrups so that the bolls are not broken but fall down into the chamber 9. After frost, when the unopened bolls have become dry and it is desired to recover the cotton therein, the arm 66 is pulled downward to cause the breaker spikes 44 to enter the housing and pins 72 and 73 are inserted in the stirrups to hold the bars 42 and 43 in their raised position to cooperate with the spikes 48 on the spiked feed roller 29.

Figure 6:
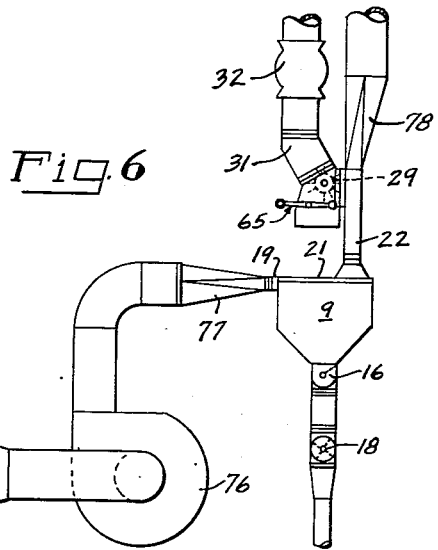

Referring now particularly to Figs. 1 to 6, in operation, air is heated in the heater shown in Fig. 6 and is drawn through the heater and delivered by means of a blower 76, through a transition conduit 77, through the wide inlet opening 19 into the relatively large chamber 8 at the upper front thereof. From the chamber 9, it passes upwardly and outwardly at the rear through the passage 22 where it comes in contact with seed cotton delivered by the spiked feed roller 29 into the passage 22 in a loose, dispersed condition, out of which heavy objects such as green bolls, stones, metal objects and the like may readily fall. These objects are discharged from the chamber 9 by means of the screw conveyor 16 and air sealed dropper 18. The cotton, being dried and conveyed by means of the heated air, passes upwardly through the passage 22 and is discharged therefrom through a delivery conduit 78 to be further processed in a manner well understood in the art. During seasons when green bolls are mixed with the cotton, the bars 42 and 43 with their breaker spikes 44 are withdrawn from the housing so that the green bolls may fall down the passage 22 and be separated from the seed cotton. During seasons when there are no green bolls, but dried unopened bolls, the bars 42 and 43 are raised to the positions shown in Figs. 1 and 3, where the spikes 44 cooperate with the spikes 48 on the feed roller 29 and break the dried bolls to recover the cotton therein. As is well known, the condition of cotton as it comes from the field varies as to moisture content and other factors which vary its weight per volume so that the velocity of the air in which the separation of the heavy objects is carried out should vary to compensate for the condition of the cotton. To meet these conditions, the plate valve 23 may be moved inwardly or outwardly with respect to the passage 22 and thereby vary the velocity of the air.

From the foregoing, it will be apparent that I have devised an improved apparatus for separating heavy objects from seed cotton which is simple and economical of design, easy to manufacture, and one which is reliable in operation.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In apparatus for separating relatively heavy objects from seed cotton, a housing defining in its lower portion a relatively large chamber and having a relatively shallow passage extending upwardly from across the top of the chamber at the rear thereof, means to introduce seed cotton in a loose, dispersed condition laterally into the passage above the chamber, means at the front of the chamber to introduce heated air under pressure to flow the length of the chamber and to pass upwardly through said passage conveying the cotton with it, and permitting heavy objects to drop downwardly through the passage and an air sealed dropper in the bottom of the chamber.

2. In apparatus for separating relatively heavy objects from seed cotton, a housing defining in its lower portion a relatively large chamber and a relatively shallow passage extending upwardly across the top of the chamber at the rear thereof, an inlet formed in and extending across the side of the passage adjacent the upper end thereof, a feeder housing connected to the inlet, a spiked feed roller in the feeder housing disposed to deliver seed cotton through the inlet into said passage in a loosely dispersed condition, means to introduce heated air under pressure into the front of the chamber to pass upwardly and convey the cotton upwardly through said passage, and an air sealed dropper in the bottom of the chamber.

3. In apparatus for separating relatively heavy objects from seed cotton, a housing defining in its lower portion a relatively large chamber and a relatively shallow passage extending upwardly across the top of the chamber at the rear thereof, an inlet formed in and extending across the side of the passage adjacent the upper end thereof, a feeder housing connected to the inlet, a spiked feed roller in the feeder housing disposed to deliver seed cotton through the inlet into said passage in a loosely dispersed condition, means to introduce heated air under pressure into the front of the chamber to pass upwardly and convey the cotton upwardly through said passage, means in the passage to vary the velocity of the air stream therein adjacent the inlet opening, and an air sealed dropper in the bottom of the chamber.

4. Apparatus as defined in claim 3 in which an air sealed dropper is disposed above the feeder housing.

5. In apparatus for separating relatively heavy objects from seed cotton, a housing defining in its lower portion a relatively large chamber, and a relatively shallow passage extending upwardly across the top of the chamber at the rear thereof, an inlet opening formed in and extending across the passage adjacent the upper end thereof, a feeder housing communicating with the opening, a spiked feed roller mounted in the feeder housing in position to deliver seed cotton through the inlet into the passage, boll breaker pins mounted in the wall of the feeder housing in position to cooperate with the spiked feed roller, means to retract the pins outwardly of the feeder housing, means to introduce heated air under pressure into the front of the chamber to pass upwardly and convey the cotton upwardly through said passage, and air sealed means to discharge heavy objects falling out of the cotton from the bottom of the chamber.

6. In apparatus for separating relatively heavy objects from seed cotton, a housing defining in its lower portion a relatively large chamber, and a relatively shallow passage extending upwardly across the top of the chamber at the rear thereof, an inlet opening formed in and extending across the passage at the upper end thereof, a feeder housing communicating with the opening, a spiked feed roller mounted in the feeder housing in position to deliver seed cotton through the inlet into the passage, boll breaker pins mounted in the wall of the feeder housing in position to cooperate with the spiked feed roller, means to retract the pins outwardly of the feeder housing, means to introduce heated air under pressure into the front of the chamber to pass upwardly and convey the cotton upwardly through said passage, air sealed means to discharge heavy objects falling out of the cotton from the bottom of the chamber, a downwardly extending conduit connected to the upper end of the feeder housing for delivering cotton to be cleaned thereinto, and an air sealed dropper in said conduit.

7. Apparatus for separating stones, green bolls and other heavy objects from seed cotton comprising a main housing including an upwardly extending relatively wide shallow passage, a delivery conduit connected to the upper end of the passage, an inlet opening formed in and extending the width of the passage adjacent the upper end thereof, a feeder housing connecting with the opening, a spiked feed roller in the feeder housing in position to deliver cotton through the inlet into the passage, a pair of spiked bars mounted outside of the feeder housing each with a plurality of spikes disposed to enter and be retracted from the housing, means to advance and retract the bars whereby to cause the spikes on the bars to cooperate with the spikes on the feed roller to break cotton bolls when required, a relatively larger chamber forming the lower part of the main housing and forming a plenum chamber for the reception of heated air and a receptacle for heavy objects falling out of the cotton, and means to introduce heated air under pressure into said chamber to pass upwardly and convey the cotton upwardly through said passage.

8. Apparatus for separating stones, green bolls and other heavy objects from seed cotton comprising a main housing including an upwardly extending relatively wide shallow passage, a delivery conduit connected to the upper end of the passage, an inlet opening formed in and extending the width of the passage adjacent the upper end thereof, a feeder housing connecting with the opening, a spiked feed roller in the feeder housing in position to deliver cotton into the passage, a pair of spiked bars mounted outside of the feeder housing each with a plurality of spikes disposed to enter and be retracted from the housing, means to advance and retract the bars whereby to cause the spikes on the bars to cooperate with the spikes on the feed roller to break cotton bolls when required, a relatively larger chamber forming the lower part of the main housing and forming a plenum chamber for the reception of heated air and a receptacle for heavy objects falling out of the cotton, means to introduce heated air under pressure into said chamber to pass upwardly and convey the cotton upwardly through said passage, a feeder conduit connected to the upper end of the feeder housing, and an air sealed dropper in said feeder conduit.

9. Apparatus for separating stones, green bolls and other heavy objects from seed cotton comprising a main housing including an upwardly extending relatively wide shallow passage, a delivery conduit connected to the upper end of the passage, an inlet opening formed in and extending the width of the passage adjacent the upper end thereof, a feeder housing connecting with the opening, a spiked feed roller in the feeder housing in position to deliver cotton through the inlet into the passage, a pair of spiked bars mounted outside of the feeder housing each with a plurality of spikes disposed to enter and be retracted from the housing, means to advance and retract the bars whereby to cause the spikes on the bars to cooperate with the spikes on the feed rollers to break cotton bolls when required, a relatively larger chamber forming the lower part of the main housing and forming a plenum chamber for the reception of heated air and a receptacle for heavy objects falling out of the cotton, means to introduce heated air under pressure into said chamber to convey the cotton upwardly from the inlet in the passage while permitting heavy objects to drop downwardly through the air stream in the passage into the chamber, means to vary the cross sectional area of the passage below and adjacent the feeder inlet, a feeder conduit connected to the upper end of the feeder housing and extending upwardly therefrom, and an air sealed dropper in said feeder conduit.

10. Apparatus as set forth in claim 9 in which the heated air is introduced at the upper front of the relatively large chamber and the passage into which cotton is fed extends upwardly from the rear thereof, and in which air sealed means are provided for discharging heavy objects from the relatively large chamber.

References Cited in the file of this patent
UNITED STATES PATENTS

| | | |
|---|---|---|
| 962,343 | Hart | June 21, 1910 |
| 1,260,581 | Rodgers | Mar. 26, 1918 |
| 1,917,954 | Deems | July 11, 1933 |
| 2,071,049 | Streun | Feb. 16, 1937 |
| 2,148,184 | Baker | Feb. 21, 1939 |
| 2,214,680 | Sims | Sept. 10, 1940 |
| 2,681,476 | Van Doorn | June 22, 1954 |